US012777299B1

(12) United States Patent
Rapoport

(10) Patent No.: US 12,777,299 B1
(45) Date of Patent: Oct. 27, 2026

(54) PHASE-TRUE SELF-REFERENCE FOR ACOUSTIC TRANSDUCERS USING FIELD-COUPLED EXCITATION AND COMPLEX RESPONSE FINGERPRINT CORRECTION

(71) Applicant: Uri Benjamin Rapoport, Moshav Ben Shemen (IL)

(72) Inventor: Uri Benjamin Rapoport, Moshav Ben Shemen (IL)

(73) Assignee: VEXARA GMBH, Frankfurt am Main (DE)

( * ) Notice: Subject to any disclaimer, the term of this patent is extended or adjusted under 35 U.S.C. 154(b) by 0 days.

(21) Appl. No.: 19/538,857

(22) Filed: Feb. 12, 2026

Related U.S. Application Data

(60) Provisional application No. 63/958,859, filed on Jan. 12, 2026, provisional application No. 63/958,867, filed on Jan. 12, 2026, provisional application No. 63/955,419, filed on Jan. 7, 2026, provisional application No. 63/931,838, filed on Dec. 5, 2025, provisional application No. 63/927,441, filed on Nov. 29, 2025, provisional application No. 63/923,398, filed on Nov. 23, 2025, provisional application No. 63/923,184, filed on Nov. 22, 2025, provisional application No. 63/918,520, filed on Nov. 16, 2025, provisional application No. 63/918,231, filed on Nov. 15, 2025, provisional application No. 63/918,234, (Continued)

(51) Int. Cl.
*H04R 29/00* (2006.01)
*H04R 3/00* (2006.01)

(52) U.S. Cl.
CPC ........... *H04R 29/004* (2013.01); *H04R 3/005* (2013.01)

(58) Field of Classification Search
CPC .............................. H04R 29/004; H04R 3/005
See application file for complete search history.

(56) References Cited

U.S. PATENT DOCUMENTS 5,029,215 A 7/1991 Miller, II
5,125,260 A 6/1992 Hedeen
(Continued)

FOREIGN PATENT DOCUMENTS

DE 3904373 A1 3/1990
EP 2462414 A1 6/2012
(Continued)

*Primary Examiner* — Jason R Kurr
(74) *Attorney, Agent, or Firm* — The Roy Gross Law Firm, LLC; Roy D. Gross

(57) ABSTRACT

A self-referenced acoustic transducer module comprising: an acoustic transducer configured to generate a sensing signal in response to an acoustic field; a field-coupled excitation element configured to inject a known excitation into a physical structure of the acoustic transducer such that the excitation traverses a transfer function corresponding to the sensing signal; a measurement front-end configured to acquire an electrical response of the acoustic transducer to the excitation and to estimate a complex response of the electrical response; a memory storing a baseline fingerprint comprising complex response values; and a controller configured to compare the estimated complex response to the baseline fingerprint to determine a mismatch and to compute and apply correction parameters to maintain phase truth of the sensing signal.

20 Claims, 5 Drawing Sheets

Self-referenced phase-truth transducer module (schematic).

Related U.S. Application Data filed on Nov. 15, 2025, provisional application No. 63/917,286, filed on Nov. 14, 2025.

(56) References Cited

U.S. PATENT DOCUMENTS

| | | | | |
|---|---|---|---|---|
| 5,930,201 | A | 7/1999 | Cray | |
| 7,428,309 | B2 | 9/2008 | Malvar et al. | |
| 7,515,721 | B2 | 4/2009 | Tashev et al. | |
| 10,042,038 | B1 | 8/2018 | Lord | |
| 2005/0169483 | A1 | 8/2005 | Malvar et al. | |
| 2005/0175190 | A1 | 8/2005 | Tashev et al. | |
| 2008/0175407 | A1 | 7/2008 | Zhang et al. | |
| 2011/0033062 | A1 | 2/2011 | Deng | |
| 2011/0075859 | A1 | 3/2011 | Kim et al. | |
| 2014/0060146 | A1* | 3/2014 | Zoellin | G01L 25/00 73/862.473 |
| 2015/0010157 | A1* | 1/2015 | Doller | H04R 3/005 381/58 |
| 2022/0210591 | A1* | 6/2022 | Malandruccolo | H04R 1/04 |
| 2023/0064937 | A1* | 3/2023 | Stoica | G01D 18/00 |

FOREIGN PATENT DOCUMENTS

| | | | |
|---|---|---|---|
| WO | 1996000488 | A1 | 1/1996 |
| WO | 1999035470 | A1 | 7/1999 |
| WO | 2017167876 | A1 | 10/2017 |

* cited by examiner

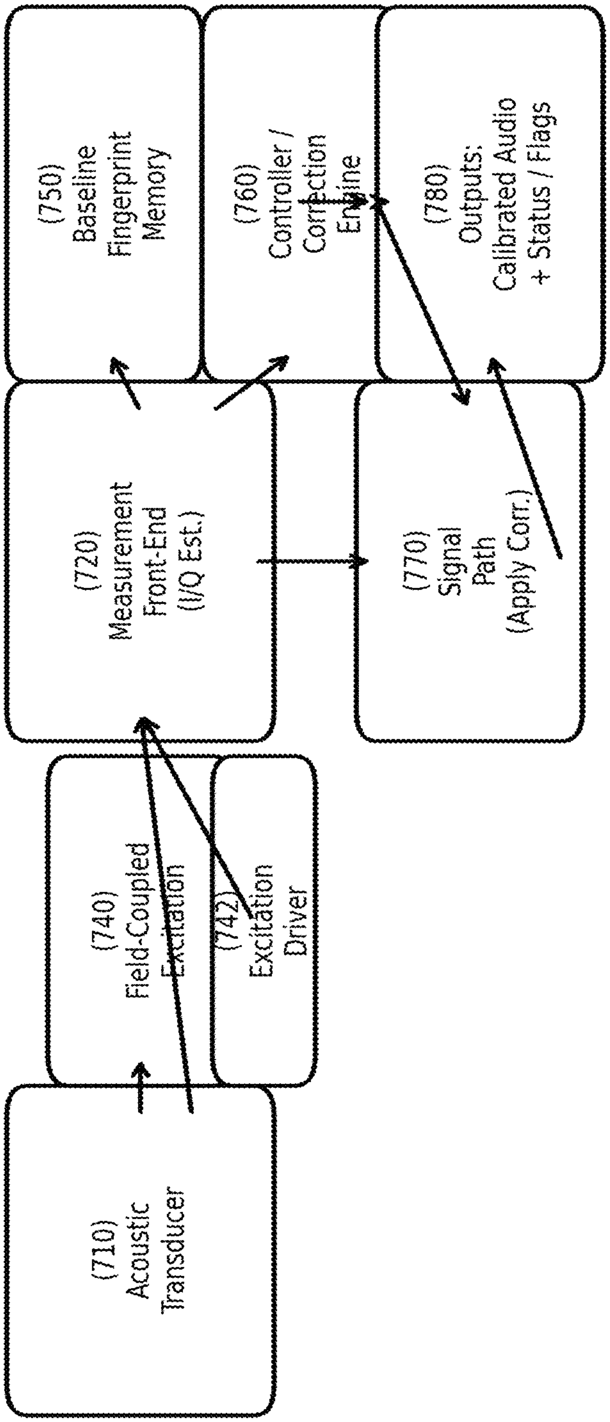
FIG. 1 — Self-referenced phase-truth transducer module (schematic).

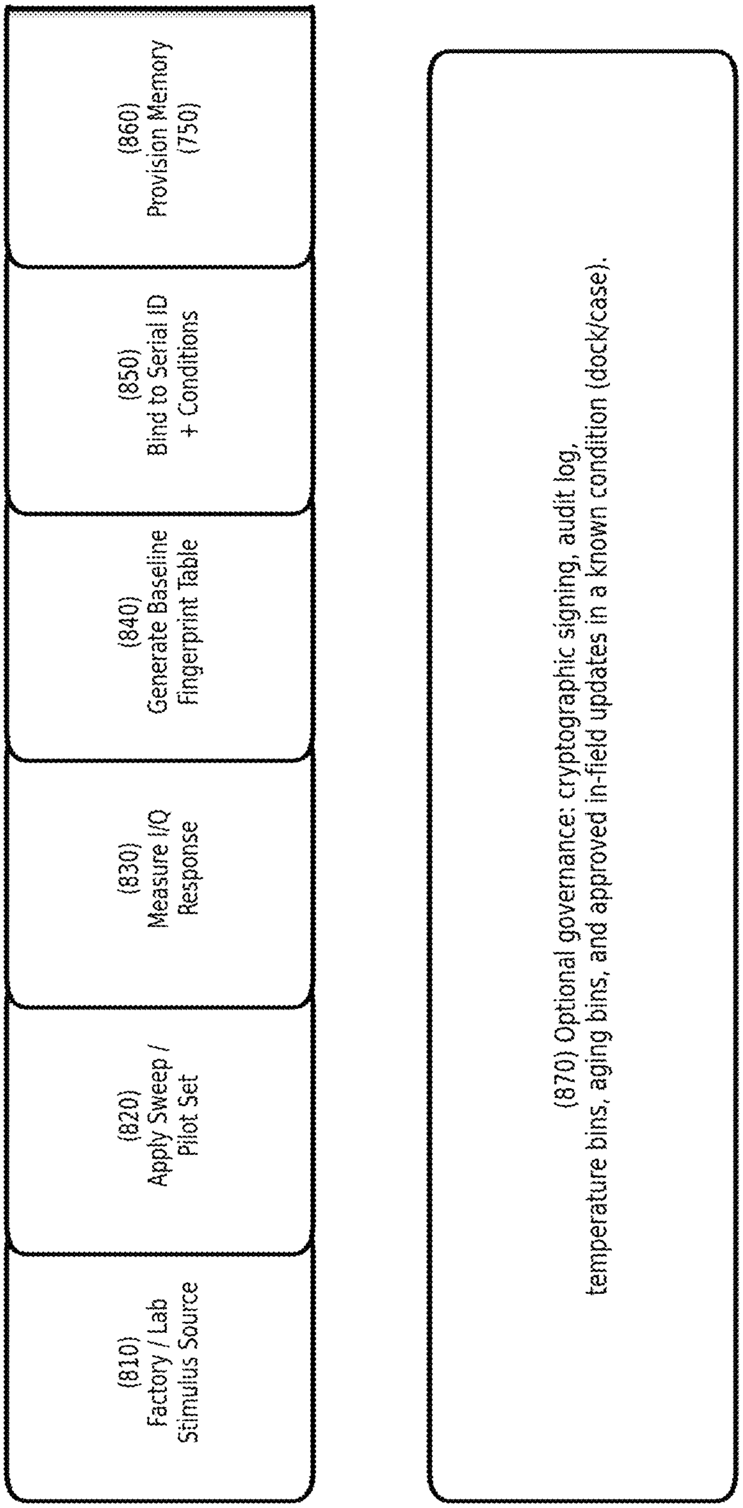
FIG. 2 — Baseline fingerprint generation and provisioning (schematic).

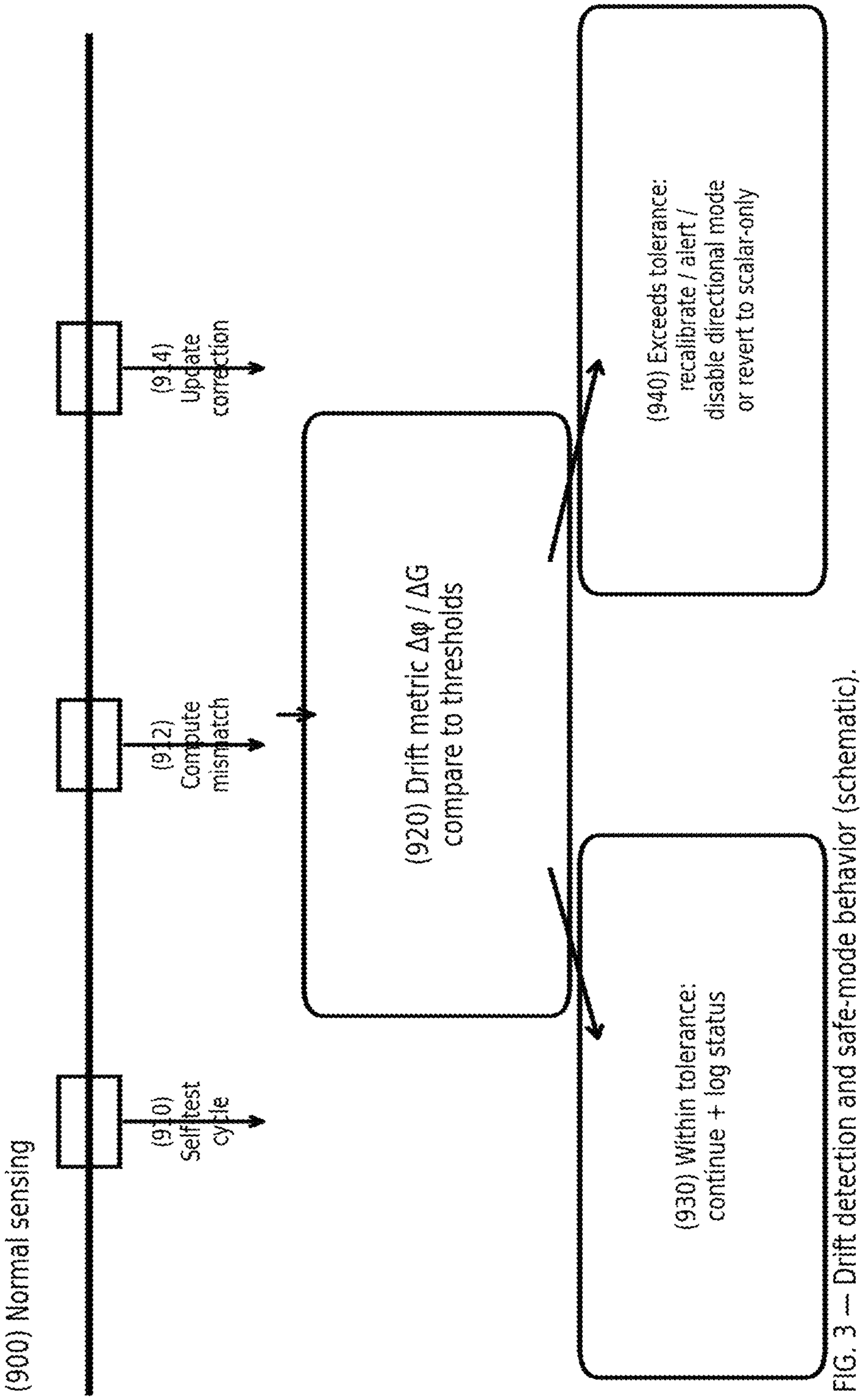
FIG. 3 — Drift detection and safe-mode behavior (schematic).

(1000) Baseline Fingerprint Table (Example)

| Freq f_k | Temp bin T_m | I_km | Q_km | Δφ_km | Gain_km |
|---|---|---|---|---|---|
| 1 kHz | 25°C | +0.87 | -0.12 | +1.6° | 0.98 |
| 2 kHz | 25°C | +0.65 | -0.24 | +2.4° | 1.01 |
| 4 kHz | 25°C | +0.20 | -0.41 | +3.1° | 1.03 |
| | | | | | |
| | | | | | |

FIG. 4 — Example baseline fingerprint and correction table structure (schematic).

PHASE-TRUE SELF-REFERENCE FOR ACOUSTIC TRANSDUCERS USING FIELD-COUPLED EXCITATION AND COMPLEX RESPONSE FINGERPRINT CORRECTION

CROSS REFERENCE TO RELATED APPLICATIONS

This application claims the benefit of priority of U.S. Provisional Patent Application Nos. 63/917,286 filed Nov. 14, 2025; 63/918,231 filed Nov. 15, 2025; 63/918,234 filed Nov. 15, 2025; 63/918,520 filed Nov. 16, 2025; 63/923,184 filed Nov. 22, 2025; 63/923,398 filed Nov. 23, 2025; 63/927,441 filed Nov. 29, 2025; 63/931,838 filed Dec. 5, 2025; 63/955,419 filed Jan. 7, 2026; 63/958,859 filed Jan. 12, 2026; and 63/958,867 filed Jan. 12, 2026. The contents of the aforementioned applications are all incorporated herein by reference in their entirety.

TECHNICAL FIELD AND BACKGROUND OF THE INVENTION

The present disclosure relates to calibration and self-verification of acoustic transducers and multi-channel microphone modules, and more particularly to techniques for maintaining phase truth and channel alignment over time using a built-in field-coupled excitation and complex (I/Q) response fingerprints.

Directional audio, acoustic field-observable systems, and any system that derives bearing, coherence, or other spatial observables from multiple channels depend on accurate relative phase and gain relationships among channels. Even when a transducer or module is well characterized at manufacture, real-world operation introduces drift mechanisms including temperature cycling, mechanical stress, aging of mechanical joints, magnet demagnetization, contamination, and humidity-induced changes in acoustic impedance. These effects can distort the complex transfer function of the transducer and thereby degrade downstream computation that relies on phase truth.

Known approaches include factory-only calibration, periodic user-initiated calibration with external stimuli, and algorithmic compensation inferred from ambient sounds. Factory-only approaches cannot correct in-field drift; external-stimulus calibration is inconvenient and inconsistent; and ambient-sound inference can fail under low-SNR, impulsive, or non-stationary conditions, or when the operating environment is not acoustically controlled.

Accordingly, there is a long-felt need for an integrated, repeatable, low-power self-reference mechanism that can be executed in the field to verify and correct the complex response of an acoustic transducer and/or channel set, including phase, gain, and quadrature imbalance, and to provide fault signaling and safe operation when phase truth cannot be maintained within a specified tolerance.

SUMMARY OF THE INVENTION

In one aspect, a transducer module comprises: (a) an acoustic transducer including a sensing structure having a physical transfer function that maps an incident acoustic pressure field to an electrical sensing output; (b) a field-coupled excitation element mechanically, electrostatically, piezoelectrically, magnetically, thermally, or otherwise physically coupled to the sensing structure so as to inject an internally generated stimulus that propagates through at least a material portion of the same physical transfer function used during sensing (thereby exercising drift mechanisms of the transducer rather than only a digital or electrical measurement path); (c) an excitation driver configured to apply one or more known excitation waveforms to the excitation element at one or more calibration times; (d) a measurement front-end configured to acquire an electrical response produced by the transducer in response to the excitation and to estimate a complex response of the transducer, including in-phase and quadrature components or an equivalent complex representation, for one or more frequencies or bands; (e) a memory storing a baseline fingerprint comprising complex response values for the transducer and optionally for one or more operating conditions; and (f) a controller configured to (i) compare an estimated complex response to the baseline fingerprint to determine one or more mismatch values, (ii) compute correction parameters based at least on the mismatch values, and (iii) apply the correction parameters to maintain phase truth, gain alignment, and/or quadrature correctness of a sensing signal of the transducer during normal operation. In non-limiting implementations, the correction parameters include one or more of: a complex gain (magnitude and phase) applied in a digital domain, a phase offset applied per frequency band, a gain scalar applied per frequency band, an I/Q rotation and scaling correction, a group-delay correction, a cross-channel alignment correction, and combinations thereof. The correction parameters may be applied to an audio path, a metadata path, a beamforming path, a sound-source localization path, a coherence estimation path, or any other downstream computation that depends on phase truth.

In another aspect, the baseline fingerprint comprises complex response values indexed by at least one of: (i) frequency, (ii) time, (iii) temperature, (iv) humidity, (v) supply voltage, (vi) battery state, (vii) barometric pressure, (viii) mechanical stress state or mounting configuration, (ix) acoustic load state (including presence of wind screen, grill contamination, or enclosure configuration), (x) operating mode (including voice mode, high-SPL mode, low-power mode, or a diagnostic mode), and (xi) any combination of the foregoing. In one embodiment, the baseline fingerprint defines, for each of a plurality of calibration frequencies or bands, expected complex transfer values and tolerances and optionally one or more dependent parameters describing front-end compensation. In another embodiment, the controller computes correction parameters including phase offsets, gain scalars, quadrature imbalance parameters, and/or I/Q rotation parameters that (a) correct amplitude and phase simultaneously using complex multiplication, (b) compensate quadrature skew, DC offsets, and gain imbalance in an I/Q demodulation chain, and/or (c) maintain phase truth within a tolerance across a defined band and across operating conditions without requiring an external acoustic stimulus. The tolerance may be specified as a maximum absolute phase error, a maximum differential phase error between channels, a maximum group-delay error, a maximum gain error, or combinations thereof, each optionally varying with frequency and operating condition.

In another aspect, the controller is configured to compute one or more self-reference metrics and to control operation based on such metrics. The self-reference metrics may include, without limitation: (i) a per-frequency complex error vector magnitude between a measured response and a baseline response; (ii) an accumulated phase error across a band; (iii) an inter-channel phase difference error; (iv) a gain drift metric; (v) an I/Q orthogonality metric; (vi) a coherence metric computed from repeated self-tests; and (vii) a confidence score derived from any combination of the foregoing. When a metric exceeds a threshold, the controller may declare a fault state, transition the system to a safe operating mode, trigger a recalibration or higher-frequency self-test routine, output a user-facing or system-facing service alert, log an audit record, and/or gate or qualify outputs with status metadata. In non-limiting embodiments, safe operation comprises one or more of: disabling or degrading directional audio mode, beamforming, or sound-source localization; reverting to scalar-only or monaural operation; increasing redundancy weighting; switching to a subset of channels or a backup transducer; freezing last-known-good calibration parameters; outputting only confidence-qualified metadata; or reducing feature outputs to a limited set with explicit uncertainty bounds. In one example, the module generates a status word or structured metadata that indicates whether phase-truth calibration is within specification, marginal, or out of specification, so that downstream consumers can deterministically distinguish calibrated outputs from degraded outputs.

In another aspect, the self-reference mechanism is applied across a multi-channel module comprising two or more acoustic channels. The channels may include, without limitation: two or more spaced microphones; a co-located pressure sensor plus one or more spatial-derivative channels; a vector sensor; an array element comprising multiple capsules; or a hybrid module combining MEMS and non-MEMS transducers. The controller may execute the self-reference routine per channel, sequentially, concurrently, or in an interleaved schedule, and may enforce cross-channel phase and gain relationships using both per-channel fingerprints and inter-channel constraints. In one embodiment, the baseline fingerprint includes inter-channel complex relationships (including relative phase and relative gain) so that the module maintains a calibrated reference frame for spatial observables, including bearing, coherence, and direction-of-arrival estimates. In another embodiment, the self-reference mechanism is configured such that attempts to correct phase solely in software without exercising the underlying physical transfer path are detectable as a mismatch of the field-coupled response, thereby strengthening robustness against drift and reducing susceptibility to design-arounds that preserve physics while bypassing physical self-reference.

An object of the invention is to disclose a self-referenced acoustic transducer module that generates a sensing signal in response to an acoustic field and that includes a field-coupled excitation element configured to inject a known excitation into a physical structure of the acoustic transducer such that the excitation traverses a transfer function corresponding to the sensing signal, a measurement front-end configured to acquire an electrical response to the excitation and to estimate a complex response, a memory storing a baseline fingerprint that includes complex response values, and a controller configured to compare the estimated complex response to the baseline fingerprint to determine a mismatch and to compute and apply correction parameters to maintain phase truth of the sensing signal.

An object of the invention is to disclose such a module wherein the baseline fingerprint includes a table indexed by at least one of frequency and operating condition, and wherein the correction parameters include at least one of a phase offset, a gain scalar, an I/Q imbalance correction, or a quadrature rotation parameter.

An object of the invention is to disclose such a module wherein the controller is configured to declare a fault state when the mismatch exceeds a threshold and to perform at least one of triggering recalibration, outputting a service alert, logging an audit record, or disabling a directional processing mode.

An object of the invention is to disclose such a module wherein the field-coupled excitation element includes at least one of: a pilot coil magnetically coupled to a magnetic circuit of an electrodynamic capsule; an electrostatic actuation electrode of a MEMS microphone; or a drive electrode of a piezoelectric transducer.

An object of the invention is to disclose such a module wherein the measurement front-end is configured to compute the complex response by synchronous demodulation of the electrical response with respect to a reference derived from the known excitation.

An object of the invention is to disclose such a module wherein the baseline fingerprint further includes cross-channel phase relationships among a plurality of channels of a multi-channel module, and wherein the correction parameters preserve the cross-channel phase relationships.

An object of the invention is to disclose such a module wherein the controller is configured to apply the correction parameters in an analog domain, a digital domain, or a mixed-signal domain.

An object of the invention is to disclose such a module wherein the controller is configured to compute a drift metric including at least one of accumulated phase drift, gain drift, or an orthogonality metric indicative of I/Q imbalance.

An object of the invention is to disclose such a module wherein the controller increases a self-reference cadence responsive to at least one of temperature slew, vibration level, or detected drift.

An object of the invention is to disclose such a module wherein the baseline fingerprint is cryptographically bound to at least one of a serial identifier, a manufacturing lot identifier, or a device public key.

An object of the invention is to disclose such a module wherein the controller permits an in-field update of the baseline fingerprint only when a self-reference metric satisfies a stability condition and the module is in a known operating condition including a dock, charging case, or test enclosure.

An object of the invention is to disclose such a module wherein the controller maintains both a factory baseline fingerprint and an adapted baseline fingerprint and is configured to revert to the factory baseline fingerprint responsive to detection of instability.

An object of the invention is to disclose such a module wherein the acoustic transducer includes a co-located acoustic field node configured to measure acoustic pressure and at least one spatial derivative of pressure at a same physical location, and wherein the controller outputs a calibrated spatial observable including at least one of a bearing vector, coherence score, or confidence value.

An object of the invention is to disclose a system including at least one self-referenced acoustic transducer module as described above and a host processor configured to receive at least one of calibrated audio or calibrated spatial observables from the module and to perform spatial processing based on the calibrated spatial observables.

An object of the invention is to disclose such a system wherein the host processor is configured to operate an always-on control plane carrying the calibrated spatial observables and to selectively enable a payload plane carrying waveform audio responsive to a trigger derived from the calibrated spatial observables, while preserving deterministic time and phase alignment between the control plane and the payload plane.

An object of the invention is to disclose such a system wherein the module includes a plurality of channels and wherein the system is configured to output a fault flag and to enter a safe mode that disables a directional mode and/or reverts to a scalar-only mode when the fault flag is asserted.

An object of the invention is to disclose a method of maintaining phase truth of an acoustic transducer, including applying a known excitation through a field-coupled excitation element, acquiring an electrical response to the excitation, estimating a complex response from the electrical response, comparing the complex response to a stored baseline fingerprint, computing correction parameters based on a mismatch, applying the correction parameters to a sensing signal, and outputting an indication of calibration status.

An object of the invention is to disclose such a method further including computing a drift metric and, responsive to determining that the drift metric exceeds a threshold, performing at least one of increasing a self-test rate, declaring a fault state, logging an audit record, disabling a directional processing mode, or reverting to scalar-only operation.

An object of the invention is to disclose such a method wherein the baseline fingerprint includes a table indexed by frequency and temperature, and wherein the method further includes interpolating correction parameters for intermediate temperature values.

An object of the invention is to disclose a non-transitory computer-readable medium storing instructions that, when executed by a processor, cause the processor to perform the method of maintaining phase truth as described above.

BRIEF DESCRIPTION OF THE DRAWINGS

For the sake of clarity, the drawings are schematic representations provided for purposes of illustration and are not intended to be limiting; relative dimensions, proportions, and shapes may be exaggerated or simplified, and the figures are not necessarily drawn to scale. Like reference numerals may designate like elements throughout, and any depiction of a component in a particular orientation is not limiting to other orientations. Features shown in separate figures and/or embodiments may be combined, omitted, or replaced without departing from the scope of the invention. The accompanying drawings are provided for illustration of example embodiments and are not limiting. The drawings are schematic and not necessarily to scale; geometry, spacing, and shapes may be simplified; and some features may be exaggerated for clarity. Like reference numerals designate like elements across the figures. Unless expressly stated otherwise, the figures illustrate functional blocks and signal flows that may be implemented in hardware, firmware, software, or combinations thereof.

FIG. 1 is a block diagram of a self-referenced phase-truth transducer module, illustrating an acoustic transducer, a field-coupled excitation element and driver, a measurement front-end, a controller/correction engine, memory storing baseline fingerprints and correction parameters, a sensing path, and one or more outputs including calibrated audio and calibration status metadata. FIG. 1 further illustrates example points at which correction may be applied, including in an analog domain, a digital domain, or both, and illustrates example data flows for excitation reference signals, measured response signals, and computed correction parameters.

FIG. 2 illustrates baseline fingerprint generation and provisioning, including example manufacturing or commissioning steps for stimulating the transducer, capturing complex responses across frequency and operating conditions, generating a baseline fingerprint and tolerances, binding the fingerprint to a device identifier, optionally cryptographically protecting the fingerprint, and provisioning the fingerprint into non-volatile memory for later in-field self-reference. FIG. 2 further illustrates optional generation of both a factory baseline and an adapted baseline and rules for selection or reversion.

FIG. 3 illustrates drift detection and safe-mode behavior using a self-reference metric, including computation of one or more mismatch metrics, comparison to thresholds, classification into normal, marginal, or fault states, logging and reporting behavior, and control actions including increased self-test cadence, recalibration attempts, output gating, and feature degradation or disablement to preserve deterministic behavior when phase truth cannot be maintained.

FIG. 4 illustrates an example baseline fingerprint and correction table structure, including indexing by frequency and operating condition, storage of complex baseline values and tolerances, representation of correction parameters (including complex gain and I/Q correction), interpolation between bins, and storage of versioning, signatures, and audit information for safe updates and traceability.

FIG. 5—Detailed interpretation and example method steps. FIG. 5 may be implemented as: (a) determining a trigger for self-test, including a timer, temperature change, vibration event, device boot, user idle period, docking event, or explicit command; (b) selecting an excitation waveform, amplitude, and duration subject to limits that avoid audible artifacts and saturation; (c) generating a reference phase and applying excitation through the field-coupled element; (d) acquiring the response while optionally pausing or compensating normal audio capture; (e) computing complex response samples at selected frequencies via correlation or FFT; (f) compensating known front-end phase and delay; (g) computing mismatch metrics relative to baseline; (h) computing correction parameters including complex gains and I/Q rotation; (i) applying correction to the sensing path; (j) validating correction by an immediate re-test or by consistency checks across repeated tests; and (k) updating status, logging, and taking safe-mode actions when thresholds are exceeded. In one embodiment, the method includes estimating measurement uncertainty and using it to set confidence scores that accompany outputs.

DETAILED DESCRIPTION OF EMBODIMENTS

Figure 5:
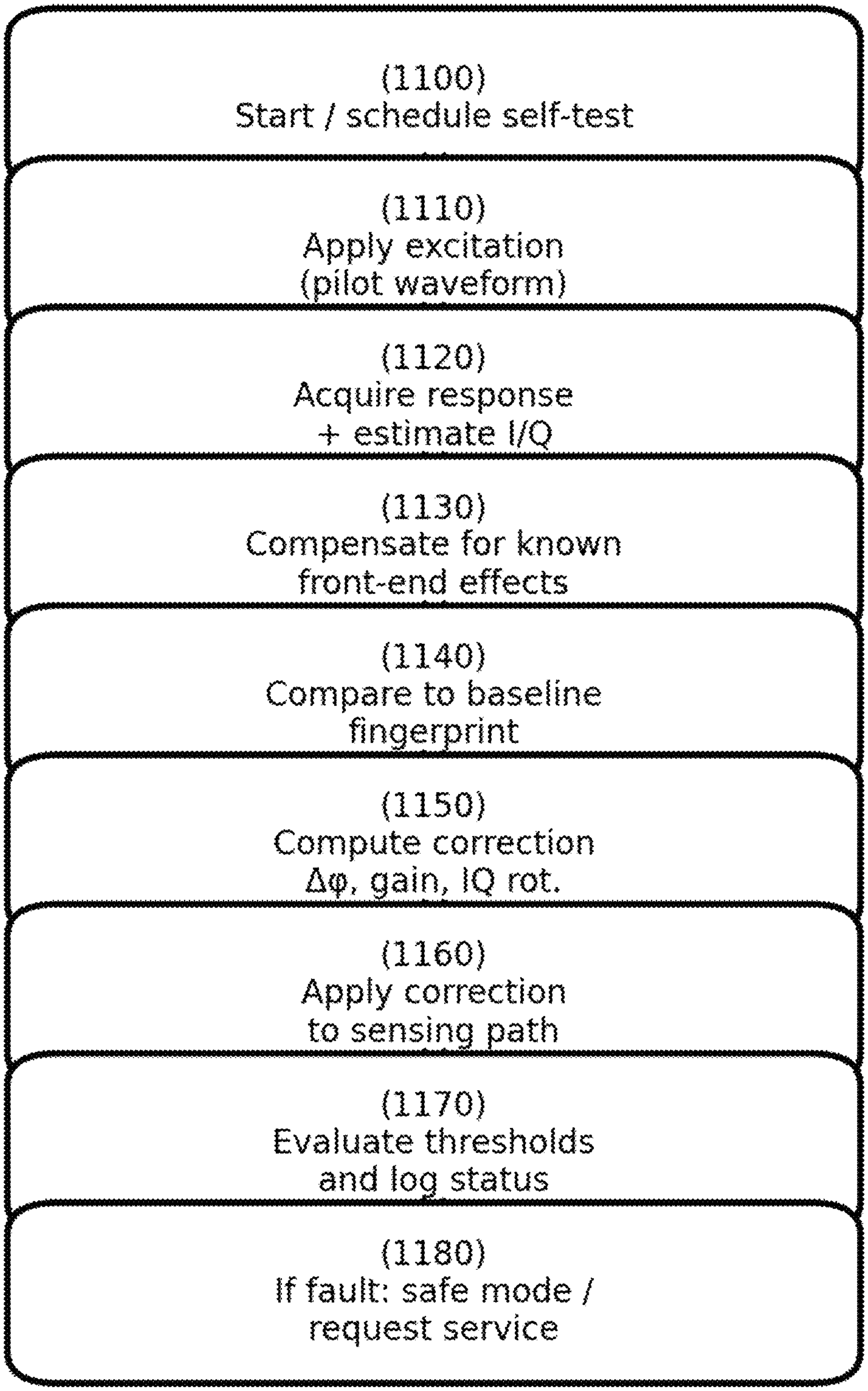
FIG. 5 is a flowchart of a method of self-referenced phase calibration, including scheduling or triggering of self-test, applying field-coupled excitation, acquiring and demodulating the response to obtain a complex estimate, compensating known front-end effects, computing mismatch metrics, computing correction parameters, applying the correction parameters, validating results, and taking safe-mode actions when results are out of tolerance.

Unless otherwise indicated, the terms "comprising", "including", "having" and the like are used in an open-ended sense. The singular forms "a", "an" and "the" include plural referents unless the context clearly dictates otherwise. The term "substantially" and similar terms denote that the recited characteristic need not be exact and may include tolerances consistent with practical engineering and/or measurement. Functional language such as "configured to" is used to denote structure, circuitry, logic, firmware, and/or software that is arranged to perform the stated function. Steps recited in methods are not necessarily performed in the stated order unless expressly indicated. In the following description, numerous specific details are set forth to provide a thorough understanding of example embodiments. However, it will be apparent to a person of ordinary skill in the art that the disclosed subject matter may be practiced without these specific details. In other instances, well-known structures, circuits, algorithms, and processes are not described in detail to avoid obscuring the disclosure. Unless otherwise stated, features described with respect to one embodiment may be combined with features of other embodiments. As used herein, "phase truth" refers to maintaining the correctness of phase (including relative phase among channels and/or absolute phase relative to a defined reference) and related complex transfer properties (including gain and quadrature correctness) such that spatial and other phase-derived observables remain within defined tolerances. As used herein, "complex response" encompasses any equivalent representation of amplitude and phase, including I/Q components, analytic-signal representations, complex frequency response samples, or parameters sufficient to reconstruct such complex behavior over one or more bands.

Overview (FIG. 1). FIG. 1 illustrates a module including an acoustic transducer (710) and a field-coupled excitation element (740). The excitation element (740) is configured such that an injected stimulus couples through substantially the same physical transfer function (or a defined, physically representative portion thereof) that is used during normal sensing, so that drift of the transducer's physical structures is observable in the self-reference measurement. In non-limiting examples: (i) in an electrodynamic capsule, the excitation element (740) comprises a pilot coil magnetically coupled to a main magnetic circuit and configured to perturb flux in a gap that also couples to a moving coil during sensing; (ii) in a MEMS microphone module, the excitation element (740) comprises an electrostatic actuation electrode arranged to impart force on a membrane or beam that also responds to acoustic pressure; (iii) in a piezoelectric transducer, the excitation element (740) comprises a drive electrode on the same piezo element or stack that also produces charge during sensing; (iv) in a capacitive transducer, the excitation element comprises a backplate or auxiliary electrode capable of modulating the electrostatic field across the diaphragm; (v) in an optical or opto-mechanical transducer, the excitation element comprises a micro-actuator that perturbs the mechanical element read optically; and (vi) in any transducer technology, the excitation element may be implemented as an integrated micro-actuator, auxiliary coil, auxiliary electrode, or other coupling structure, provided the excitation traverses the sensing transfer function in a physically representative manner. In some embodiments, the excitation element is integrated within a same package or die as the transducer; in other embodiments, it is co-packaged, mounted on a shared substrate, or otherwise mechanically coupled. In some embodiments, the module further includes a known reference clock or timing base shared between excitation generation and response demodulation to ensure deterministic phase reference.

During a self-reference routine, an excitation waveform is applied by an excitation driver (742) to the excitation element (740), and a resulting electrical response is acquired by a measurement front-end (720). In one embodiment, the excitation driver (742) includes a DAC or PWM generator, an output buffer, and circuitry to limit excitation amplitude, duration, and spectral content to avoid audible artifacts or interference with normal sensing. The response may be analyzed in complex form (I/Q) to estimate phase and gain across one or more calibration frequencies or bands. The analysis may include compensation for known front-end transfer characteristics including group delay, phase rotation, anti-alias filter response, and quantization effects, thereby isolating drift attributable to the transducer's physical transfer function. A controller or correction engine (760) compares the estimated response to a baseline fingerprint stored in memory (750), computes correction parameters, and applies the correction parameters to the sensing path (770) and/or downstream processing. In one embodiment, applying correction includes multiplying a complex digital representation of the sensed signal by a complex correction coefficient per band; in another embodiment, applying correction includes adjusting analog gain, adjusting ADC timing or phase, changing decimation filter parameters, and/or changing beamformer steering vectors. The module may output calibrated audio and calibration status or flags (780). In non-limiting examples, the status includes: a last self-test timestamp, a pass/marginal/fail indicator, a confidence metric, and a version identifier of the baseline and applied correction parameters.

Field-coupled excitation. The term "field-coupled" means the excitation couples into the same or a substantially similar mechanical/acoustic/electromagnetic structure that governs sensing, such that the self-reference measurement is sensitive to drift of the transducer and its immediate coupling structures (including adhesives, seals, suspension elements, diaphragms, magnetic circuits, and acoustic ports). Thus, the calibration routine measures drift of the physical transfer function rather than measuring only a digital path. In an electrodynamic embodiment, a pilot coil induces a controlled magnetic perturbation in a flux gap that also couples to a moving coil during sensing, so that changes in magnet strength, coil position, compliance, or damping alter the measured complex response. In a MEMS embodiment, an actuation electrode imparts electrostatic force on a membrane or beam that also responds to incident pressure, such that changes in membrane tension, stiction, or acoustic damping are observable. In a piezo embodiment, a drive electrode excites a piezo element that also produces charge during sensing, such that changes in piezo constants, bonding, or mechanical loading are observable. The pilot waveform may be a sweep, multi-tone set, chirp, pseudo-random binary sequence, maximum length sequence, or any signal suitable for estimating a complex response. In some embodiments, the excitation is outside an audible band or is masked, shaped, or scheduled to be imperceptible to a user while still enabling response estimation. In some embodiments, the excitation waveform is selected to avoid saturating the measurement front-end and to maintain linearity, and the system measures and logs a non-linearity indicator (e.g., harmonic distortion or intermodulation products) as an additional health metric.

Complex response estimation. The measurement front-end (720) may include one or more of a low-noise preamplifier, a programmable gain amplifier, an analog anti-alias filter, an ADC, and a DSP block configured to compute a complex representation. The complex representation may be computed via synchronous demodulation against a reference, via analytic signal extraction (including Hilbert-transform-based methods), via FFT-based estimation of complex frequency response, or via I/Q estimation at one or more discrete frequencies. The demodulation reference may be generated from the excitation waveform so that phase is deterministically defined. In one embodiment, for each calibration frequency f_k, the controller accumulates an in-phase correlation sum and quadrature correlation sum over an integer number of cycles to produce I_k and Q_k, optionally applying windowing to reduce spectral leakage.

In another embodiment, the system uses a multi-tone excitation and estimates complex response simultaneously for multiple bins via an FFT, optionally correcting for known excitation spectral phase. In some embodiments, the system compensates for known front-end group delay and phase rotation to isolate drift of the transducer transfer function. In further embodiments, the complex response estimation produces additional derived parameters including magnitude, phase, group delay, coherence of repeated measurements, and uncertainty bounds, and stores such parameters for trend analysis and predictive maintenance.

Baseline fingerprint (FIG. 2 and FIG. 4). The baseline fingerprint may be generated at manufacture, at end-of-line test, during commissioning, and/or during controlled updates as described herein. In one embodiment, the baseline includes a table of complex values ($I_{km}$, $Q_{km}$) or equivalent polar representations ($A_{km}$, $\varphi_{km}$) across discrete frequencies $f_k$ and operating conditions such as temperature bins $T_m$. In addition, the baseline may include: (i) a tolerance envelope per frequency and condition; (ii) a model or interpolation rule that defines allowable response variation across intermediate conditions; (iii) expected cross-channel relationships for multi-channel modules; and/or (iv) a known front-end correction to normalize the measured response. The baseline may be bound to a serial identifier and protected against unauthorized modification. In one embodiment, the baseline and/or any allowed update is cryptographically signed and stored together with an audit log including at least a timestamp, a reason code, a version number, and a summary metric of changes. In non-limiting examples, the baseline is stored in one-time programmable memory, secure flash, or a trusted execution environment, and access is controlled so that only authorized routines can update an adapted baseline under defined conditions.

Correction table and interpolation. Correction parameters may include phase offsets $\Delta\varphi$, gain scalars $\Delta G$, complex gains $C(f,T)=A(f,T)\cdot e^{j\theta(f,T)}$, I/Q imbalance parameters, and/or rotation matrices. In one embodiment, the controller computes a complex correction coefficient per frequency $f_k$ and condition $T_m$ as a ratio between baseline complex values and measured complex values, and applies the coefficient to subsequent sensed data to align the current response to the baseline. In another embodiment, the correction is applied as a piecewise linear or spline-interpolated function across frequency, optionally constrained to be smooth to avoid artifacts. Parameters may be indexed by frequency and operating condition and may be interpolated to intermediate values. In multi-channel modules, correction parameters may additionally preserve cross-channel phase relationships (e.g., between pressure and spatial-derivative channels) by applying relative constraints, such as holding a relative phase target $\varphi_{ij}(f,T)$ between channel i and channel j. In some embodiments, the correction engine separately corrects the transducer response and the measurement front-end response, such that transducer drift and front-end drift (e.g., ADC clock skew, temperature-dependent filter phase) can be distinguished and corrected appropriately.

In-field governance and safe update. In some embodiments, controlled updates to the baseline fingerprint are permitted when a self-reference metric demonstrates stable operation over a predefined interval and when the module is in a known condition (e.g., in a charging case, dock, test enclosure, quiet environment, or other verified state). Such updates may be restricted to a limited adaptation band, limited magnitude per update, and limited total number of updates, and may be logged. In some embodiments, the system maintains both a factory baseline and an adapted baseline and uses rules to revert to the factory baseline upon detection of instability, excessive drift, suspected tampering, signature failure, or after a service event. In further embodiments, an update process includes: verifying integrity and authenticity of the baseline, validating that the updated baseline remains within allowable physical parameters, and recording a monotonic counter to prevent rollback attacks in security-sensitive applications.

Drift detection and safe mode (FIG. 3). The controller may compute drift metrics such as accumulated phase error $\Delta p$ across a band, per-frequency gain drift $\Delta G$, a group-delay deviation metric, an I/Q orthogonality metric, a non-linearity metric, and/or an inter-channel mismatch metric. If one or more drift metrics exceeds a threshold, the controller may increase self-test frequency, request service, disable or degrade directional features, reduce the confidence of spatial outputs, revert to scalar-only operation, enable redundant sensing paths, and/or gate outputs based on status metadata. Thresholds may be defined as absolute values, as frequency-dependent envelopes, as context-dependent values (e.g., tighter thresholds during high-accuracy modes and looser thresholds during low-power modes), or as statistically derived thresholds based on historical behavior. In all cases, the drift handling is configured so that downstream consumers can distinguish calibrated outputs from degraded outputs, including by explicit indicators in a control plane, metadata stream, or status register. In one embodiment, the controller stores a history of drift metrics and uses trend analysis to predict impending failure (e.g., increasing phase drift rate with temperature slew), thereby enabling preemptive service alerts or mode adjustments.

Multi-channel and field-node integration. In embodiments where the transducer is a co-located acoustic field node comprising pressure plus one or more spatial-derivative channels, the self-reference routine may be executed per channel, sequentially or concurrently, and the baseline fingerprint may include inter-channel phase relationships, cross-coupling terms, and constraints that define a calibrated reference frame. In one embodiment, the controller excites each channel with a distinct orthogonal excitation code (e.g., different tones, different pseudo-random sequences, or time-multiplexed chirps) so responses can be separated even when coupling paths exist. The controller may output not only calibrated audio, but also calibrated metadata including bearing vectors, coherence scores, direction-of-arrival estimates, and confidence values, and may gate a payload stream based on control-plane metadata while preserving deterministic time and phase alignment. In further embodiments, the module supports applications including, without limitation: beamforming, sound-source localization, acoustic scene analysis, active noise control reference sensing, echo cancellation reference sensing, hearing-assist devices, conferencing systems, augmented reality spatial audio capture, robotics perception, industrial monitoring, and safety systems that rely on trustworthy spatial observables.

Non-limiting parameter examples. In one non-limiting example, a system maintains relative phase between channels within +2 degrees over a temperature range of −20° C. to +60° C., and flags a fault when a mismatch exceeds ±10 degrees at any calibration frequency. In another example, the module performs a self-test every 60 seconds during operation and increases self-test rate when vibration level, shock events, or temperature slew exceeds a threshold. In another example, the baseline fingerprint includes calibration points at 200 Hz, 500 Hz, 1 kHz, 2 kHz, 4 kHz, and 8 kHz, and the controller interpolates correction between points while enforcing smoothness constraints. In another example, a multi-channel array maintains an inter-channel group-delay mismatch below 5 microseconds for localization accuracy, and transitions to a degraded mode when mismatch exceeds 25 microseconds for more than N consecutive self-tests. These numerical examples are illustrative and do not limit the scope of the claims.

It will be understood that the disclosed techniques may be embodied as hardware, firmware, software, or any combination thereof, and may be implemented in a single integrated circuit or distributed across multiple devices. The scope of the invention is defined by the appended claims.

Commercial implementations of the disclosed self-reference and fingerprint correction include, without limitation: (i) multi-channel microphone arrays for beamforming and spatial audio; (ii) vehicle-mounted and UAV-mounted acoustic sensing nodes requiring long-term phase stability; (iii) industrial monitoring microphones subject to temperature cycling; (iv) mobile devices and wearables performing always-on acoustic event detection; and (v) test and measurement instrumentation requiring in-field calibration verification. In such implementations, the baseline fingerprint may be generated at manufacture and periodically verified in the field to maintain phase truth across channels and over time.

The invention claimed is:

1. A self-referenced acoustic transducer module comprising: an acoustic transducer (710) configured to generate a sensing signal in response to an acoustic field; a field-coupled excitation element (740) configured to inject a known excitation into a physical structure of the acoustic transducer such that the excitation traverses a transfer function corresponding to the sensing signal; a measurement front-end (720) configured to acquire an electrical response of the acoustic transducer to the excitation and to estimate a complex response of the electrical response; a memory (750) storing a baseline fingerprint comprising complex response values; and a controller (760) configured to compare the estimated complex response to the baseline fingerprint to determine a mismatch and to compute and apply correction parameters to maintain phase truth of the sensing signal.

2. The module of claim 1, wherein the baseline fingerprint comprises a table indexed by at least one of frequency and operating condition, and wherein the correction parameters comprise at least one of a phase offset, a gain scalar, an I/Q imbalance correction, or a quadrature rotation parameter.

3. The module of claim 1, wherein the controller (760) is configured to declare a fault state when the mismatch exceeds a threshold and to perform at least one of: trigger recalibration, output a service alert, log an audit record, or disable a directional processing mode.

4. The module of claim 1, wherein the field-coupled excitation element (740) comprises: a pilot coil magnetically coupled to a magnetic circuit of an electrodynamic capsule; or an electrostatic actuation electrode of a MEMS microphone; or a drive electrode of a piezoelectric transducer.

5. The module of claim 1, wherein the measurement front-end (720) is configured to compute the complex response by synchronous demodulation of the electrical response with respect to a reference derived from the known excitation.

6. The module of claim 1, wherein the baseline fingerprint further comprises cross-channel phase relationships among a plurality of channels of a multi-channel module, and wherein the correction parameters preserve the cross-channel phase relationships.

7. The module of claim 1, wherein the controller (760) is configured to apply the correction parameters in an analog domain, a digital domain, or a mixed-signal domain.

8. The module of claim 1, wherein the controller (760) is configured to compute a drift metric comprising at least one of accumulated phase drift, gain drift, or an orthogonality metric indicative of I/Q imbalance.

9. The module of claim 1, wherein the controller (760) increases a self-reference cadence responsive to at least one of temperature slew, vibration level, or detected drift.

10. The module of claim 1, wherein the baseline fingerprint is cryptographically bound to at least one of a serial identifier, a manufacturing lot identifier, or a device public key.

11. The module of claim 1, wherein the controller (760) permits an in-field update of the baseline fingerprint only when a self-reference metric satisfies a stability condition and the module is in a known operating condition comprising a dock, charging case, or test enclosure.

12. The module of claim 1, wherein the controller (760) maintains both a factory baseline fingerprint and an adapted baseline fingerprint and is configured to revert to the factory baseline fingerprint responsive to detection of instability.

13. The module of claim 1, wherein the acoustic transducer (710) comprises a co-located acoustic field node configured to measure acoustic pressure and at least one spatial derivative of pressure at a same physical location, and wherein the controller outputs a calibrated spatial observable comprising at least one of a bearing vector, coherence score, or confidence value.

14. A system comprising: at least one module according to claim 1; and a host processor configured to receive at least one of calibrated audio and calibrated spatial observables from said at least one module, the host processor being further configured to use the calibrated output for at least one of: beamforming, direction finding, localization, classification, and fault monitoring.

15. The system of claim 14, wherein the host processor is configured to fuse the calibrated output with auxiliary sensor data selected from inertial, GNSS, EO/IR, radar, LiDAR, and RF direction finding, and to output at least one of a track estimate and a confidence metric.

16. The system of claim 14, wherein the module comprises a plurality of channels and wherein the system is configured to output a fault flag when a mismatch between a measured complex response and a baseline fingerprint exceeds a threshold, and to enter a safe mode comprising at least one of: disabling a channel, re-weighting a channel, and invoking a recalibration sequence.

17. A method of maintaining phase truth of an acoustic transducer, the method comprising: applying a known excitation through a field-coupled excitation element; acquiring an electrical response of the transducer to the excitation; estimating a complex response from the electrical response; comparing the complex response to a stored baseline fingerprint; computing correction parameters based on a mismatch; applying the correction parameters to a sensing signal; and outputting an indication of calibration status.

18. The method of claim 17, further comprising computing a drift metric and, responsive to determining that the drift metric exceeds a threshold, performing at least one of: increasing a self-test rate, declaring a fault state, logging an audit record, disabling a directional processing mode, or reverting to scalar-only operation.

19. The method of claim 17, wherein the baseline fingerprint comprises a table indexed by frequency and temperature, and wherein the method further comprises interpolating correction parameters for intermediate temperature values.

20. A non-transitory computer-readable medium storing instructions that, when executed by a processor, cause the processor to perform the method of claim 17.

* * * * *